US006718342B1

(12) United States Patent
Schultz et al.

(10) Patent No.: US 6,718,342 B1
(45) Date of Patent: Apr. 6, 2004

(54) METHOD AND APPARATUS FOR NETWORK-ENABLED RISK ASSESSMENT

(75) Inventors: Troy L. Schultz, Stow, OH (US); Marc S. DeTrano, Canal Fulton, OH (US); James G. Kempe, Smithville, OH (US)

(73) Assignee: Real Time Boss, Inc., Canal Fulton, OH (US)

(*) Notice: Subject to any disclaimer, the term of this patent is extended or adjusted under 35 U.S.C. 154(b) by 205 days.

(21) Appl. No.: 09/660,156

(22) Filed: Sep. 11, 2000

Related U.S. Application Data
(60) Provisional application No. 60/230,521, filed on Sep. 1, 2000.

(51) Int. Cl.[7] .............................................. G06F 17/30
(52) U.S. Cl. ...................................... 707/104.1; 707/10
(58) Field of Search ............................. 707/10, 104.1; 703/6; 128/920, 924, 897, 923; 606/1

(56) References Cited

U.S. PATENT DOCUMENTS

| | | | | |
|---|---|---|---|---|
| 5,787,429 A | * | 7/1998 | Nikolin, Jr. ................. | 707/10 |
| 5,978,804 A | * | 11/1999 | Dietzman .................... | 707/10 |
| 6,112,750 A | * | 9/2000 | Chandra ..................... | 128/897 |
| 6,192,329 B1 | * | 2/2001 | Rider et al. ................. | 703/6 |
| 6,256,640 B1 | * | 7/2001 | Smalley et al. ............. | 707/104.1 |
| 6,336,096 B1 | * | 1/2002 | Jernberg ..................... | 705/4 |

OTHER PUBLICATIONS

Robert Runkel Titled " One Dimentional Transport with Inflow and Storage (OTIS): A Solute transport model for Streams and Rivers"0 For U S Geological Survey, Water–Resources Investigations Report 98–4018 pp. 52&53.*
Robert Runkel Titled " One Dimentional Transport with Inflow and Storage (OTIS): A Solute transport model for Streams and Rivers" For U S Geological Survey, Water–Resources Investigations Report 98–4018 pp. 52&53.*
Standard Guide for Risk–based Corrective Action Applied at Petroleum Relesease Sites[1].
Standard Provisional Guide for Risk–Based Corrective Action; Designation PS 104 –98.
Risk Assessment Guidance for Super fund vol. 1 Human Health Evaluation Manual Part A.
Risk Assessment Guidance for Superfund vol. 1—Human Health Evaluation Manual (Part B, Development of Risk–based Preliminary Remediation Goals.

* cited by examiner

Primary Examiner—Diane D. Mizrahi
(74) Attorney, Agent, or Firm—Brouse McDowell; Roger D. Emerson; Daniel A. Thomson (57) ABSTRACT

A new and improved method and apparatus for risk assessment, including the use of a global computer network. The invention utilizes network-enabled software and a global computer network in order to provide access to continuously updateable information in order to perform a risk assessment. The inventive system allows a user to access risk assessment information and reference data, within the bounds of their security restrictions.

2 Claims, 8 Drawing Sheets

STEP 3: IDENTIFY POTENTIAL CORRECTIVE MEASURES
• COMPLETE TIER 1 SUMMARY REPORT
• FILL IN EXPOSURE PATHWAY SHUT OFF VALVES ⟶ RECORD THE ABBREVIATION FOR THE CORRECTIVE MEASURE ABOVE THE VALVE, AND RECORD THE ABBREVIATION ON THE RIGHT-HAND-SIDE TABLE

METHOD AND APPARATUS FOR NETWORK-ENABLED RISK ASSESSMENT

This application claims priority to U.S. Provisional Patent Application Serial No. 60/230,521, entitled METHOD AND APPARATUS FOR NETWORK-ENABLED RISK ASSESSMENT, filed on Sep. 1, 2000.

BACKGROUND OF THE INVENTION

A. Field of Invention

This invention relates to the field of project management, and more particularly to network-enabled real property project management, and even more particularly to network-enabled risk assessment.

B. Description of the Related Art

GIS, or geographic information system, extends the functionality of a traditional database by combining spatial features with informational records. For example, a user might view a town map and be able to retrieve information such as street names, building construction dates, etc. The purpose of GIS is to use geographical representation for retrieval of underlying information.

Current real property project management involves the collection of a wide array of site data and communication between numerous project participants. One of the current problems is that multiple systems must be used to obtain all the data and perform required communications.

Real property projects have historically suffered from poor project management (i.e. lack of effective and timely communication between involved parties, including regulators, inspectors, company managers and their prime contractors and nested subcontractors) which ultimately results in higher project costs and delays. Updated status reports, paper trails, phone calls, and job site meetings are the best available tools currently used to manage real property projects, and are often inadequate to keep all project participants properly informed. For example, during the construction of a site, it is typical to use plumbers, electricians, and other subcontractors. Under the current system of project management it is possible that the project administrator will have ordered alterations to the plans on several occasions; however, these changes may not have been relayed to the subcontractors, and therefore each subcontractor may be operating from a different set of plans.

Current risk assessment has suffered similar problems. Numerous people are involved in performing a risk assessment—all the way from the people who take the samples in the field to the risk assessors and toxicologists, and everyone in between. Currently, it is a time consuming process to coordinate and organize the vast quantity of data that is produced by this process. The present invention organizes, quantifies, and analyzes this information all in one place. The inventive system takes the information from all the steps, analyzes it, and produces the necessary risk assessment documents.

Another main problem with current risk assessment is that the reference data/information is not necessarily up to date. The current invention will automatically update the reference data/information without any input from the user.

Risk software is commonly used in the industry. However, there are no examples of network-enabled risk assessment software being used to allow access to continuously up to date reference, or site, information.

II. SUMMARY OF THE INVENTION

In accordance with one aspect of the present invention, a method for network-enabled risk assessment includes the steps of utilizing a global computer network, providing risk assessment information, the information containing reference information, the reference information being continuously updateable, providing data storage means, providing data entry means for entering the information, providing means for entering exposure assessment data, which includes the steps of providing fate and transport modeling and providing means for entering at least one entity that may be exposed to at least one contaminant, providing means for entering toxicity assessment data, calculating risk characterization, providing target level development and risk assessment, providing means for factoring in uncertainty analysis data, providing controlled access to the information, updating the information, providing a deterministic analysis of risk, and providing a probabilistic analysis of risk.

In accordance with another aspect of the present invention, a risk assessment system includes a global computer network, risk assessment information, the information containing reference information, the reference information being continuously updateable, means for providing controlled access to the information, data storage means, data entry means for entering the information, means for entering exposure assessment data, the means including fate and transport modeling and means for entering at least one entity that may be exposed to at least one contaminant, means for entering toxicity assessment data, calculating means for calculating risk characterization, means for providing target level development and risk assessment, means for factoring in uncertainty analysis data, updating means for updating the information, means for providing a deterministic analysis of risk, and means for providing a probabilistic analysis of risk.

In accordance with another aspect of the current invention, the method includes utilizing a computer network, a wide-area computer network, or a global computer network.

One advantage of the present invention is that numerous projects can be tied together via the computer network.

Another advantage of the present invention is that the information regarding the projects is easily manageable.

Yet another advantage of the present invention is that a risk assessment can be carried out over a global computer network.

Still another advantage of the present invention is that any project participant can access the data, given the appropriate permission.

Another advantage of the present invention is that all of the data and other information can be stored in one virtual location, which allows quick and easy retrieval and manipulation.

Still another advantage of the present invention is that the information, and particularly the reference information and modeling programs can be continuously updated.

Still other benefits and advantages of the invention will become apparent to those skilled in the art to which it pertains upon a reading and understanding of the following detailed specification.

III. DEFINITIONS

Carcinogenic—an effect which causes the development of cancer.

Exposure Assessment—determination of what receptors are, or may be, exposed to particular contaminants at particular concentrations. Also includes how much of a contaminant they are, or may be, exposed to in the future.

Fate and Transport Modeling—determines the fate of a contaminant as it is transported between media (intermediary) or within an environmental medium (intramediary).

Information—any quantifiable data, such as physical or exposure (i.e. demographic or time and activity patterns) data. Also included in this definition are algorithms, which include any one or more pieces of the software program, up to, and including, the entire program. This term is intended to have as broad a definition as possible.

Non-carcinogenic—an effect that impacts the development, size, or functioning of the whole body or specific body organs, but does not lead to the development of cancer.

Real Property Project Management—Relating to tasks involved with coordinating and implementing work to be done on a site which relates to the physical condition of the property. Such work may include, but is not limited to, construction, environmental testing and engineering, and consulting services for such projects.

Risk assessment—quantitative process for determining the likelihood of an adverse health effect.

Target level development—Beginning with a target risk and working toward a particular concentration for a particular contaminant or contaminants in one or more media.

Toxicity Assessment—the process of weighing available evidence regarding the potential for particular contaminants to cause adverse effects in exposed receptors and to provide, where possible, an estimate of the relationship between the extent of exposure to a contaminant and the increased likelihood and/or severity of adverse effects.

Uncertainty Analysis—analysis of levels of uncertainty throughout the risk assessment process.

IV. BRIEF DESCRIPTION OF THE DRAWINGS

The invention may take physical form in certain parts and arrangement of parts, one embodiment of which will be described in detail in this specification and illustrated in the accompanying drawings which form a part hereof and herein.

V. DESCRIPTION OF THE PREFERRED EMBODIMENT

Figure 1:
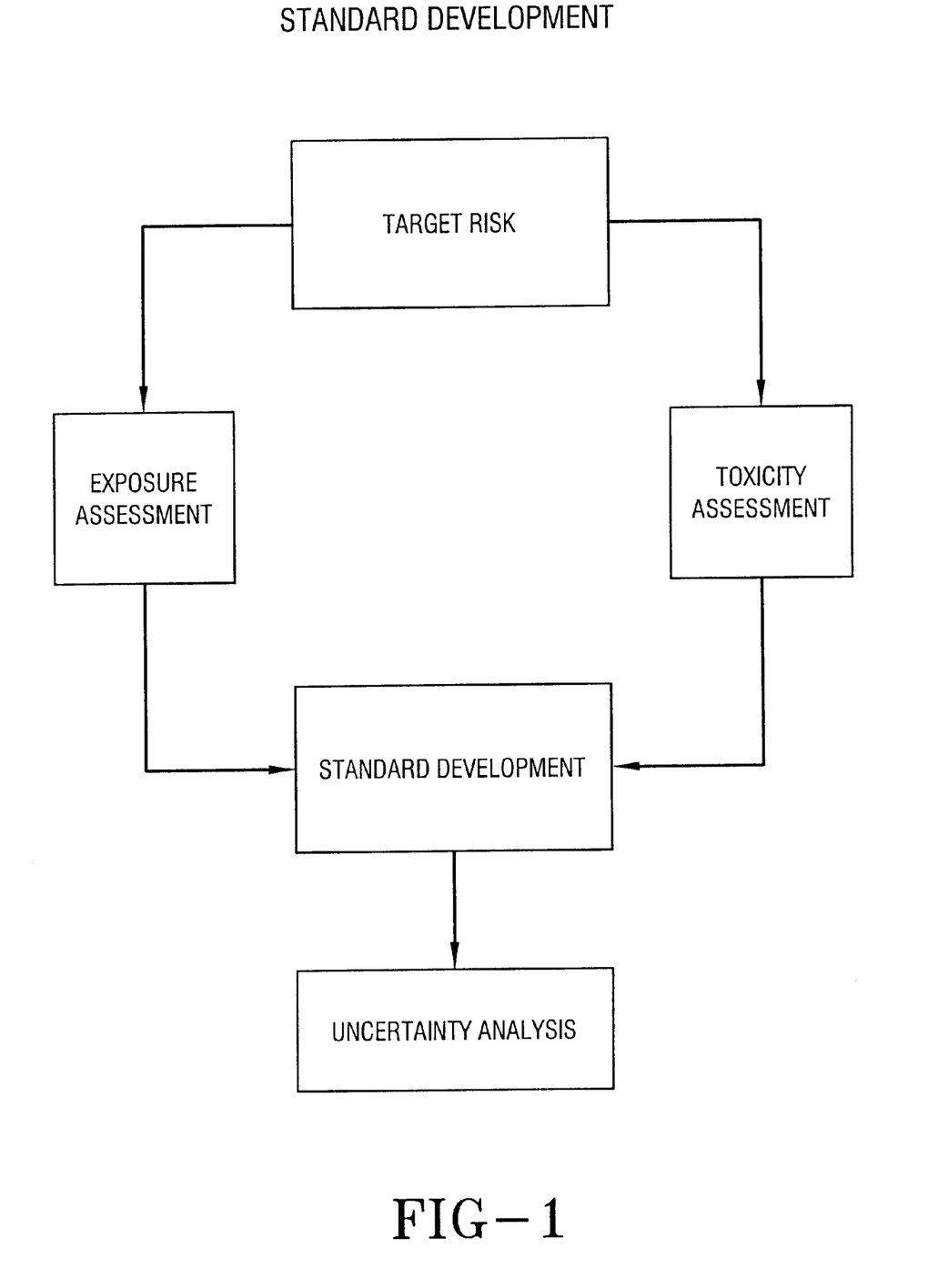
FIG. 1 is a flow chart of a baseline risk assessment.
Figure 2:
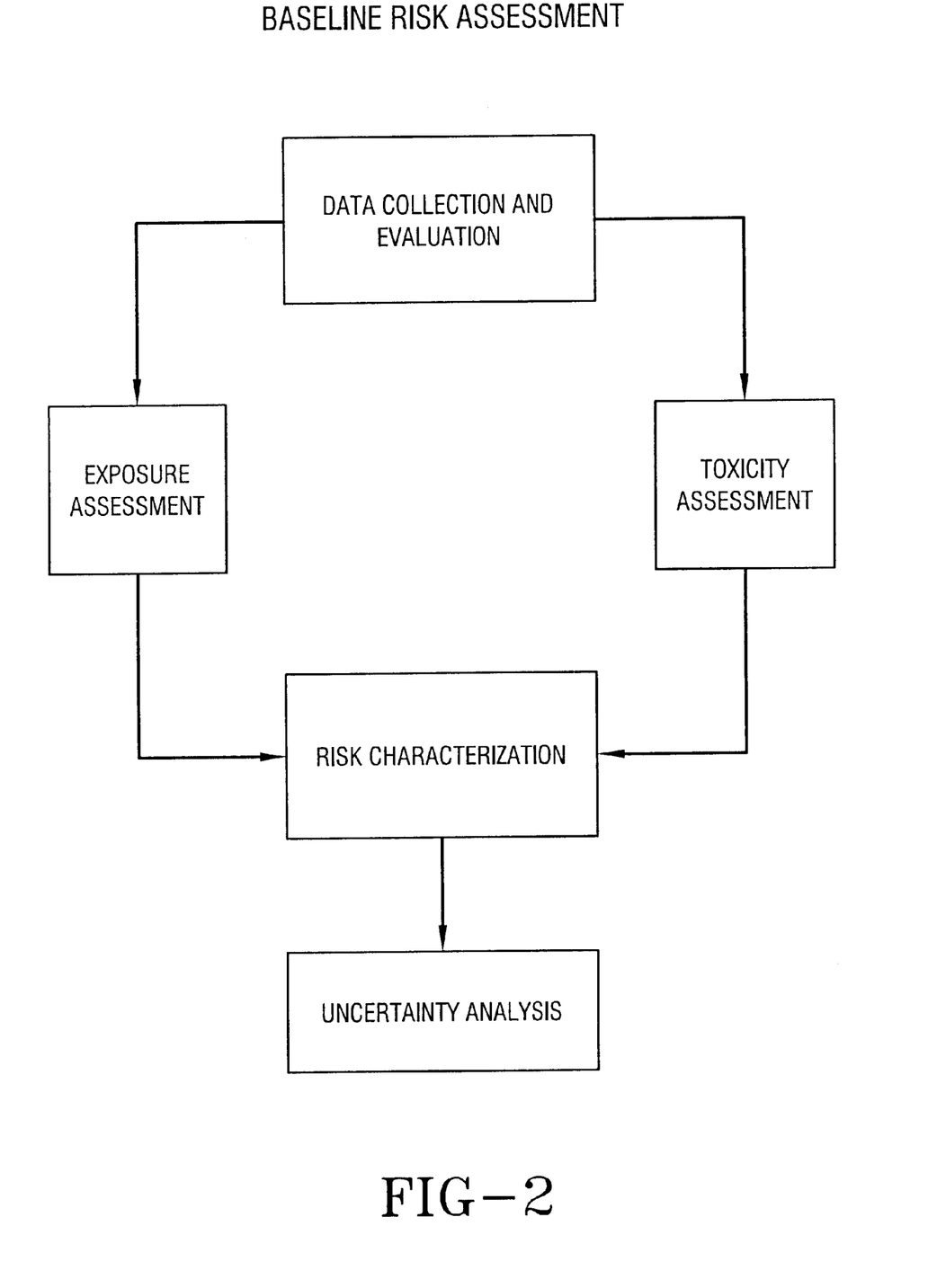
FIG. 2 is a flow chart of a standard development.
Figure 3:
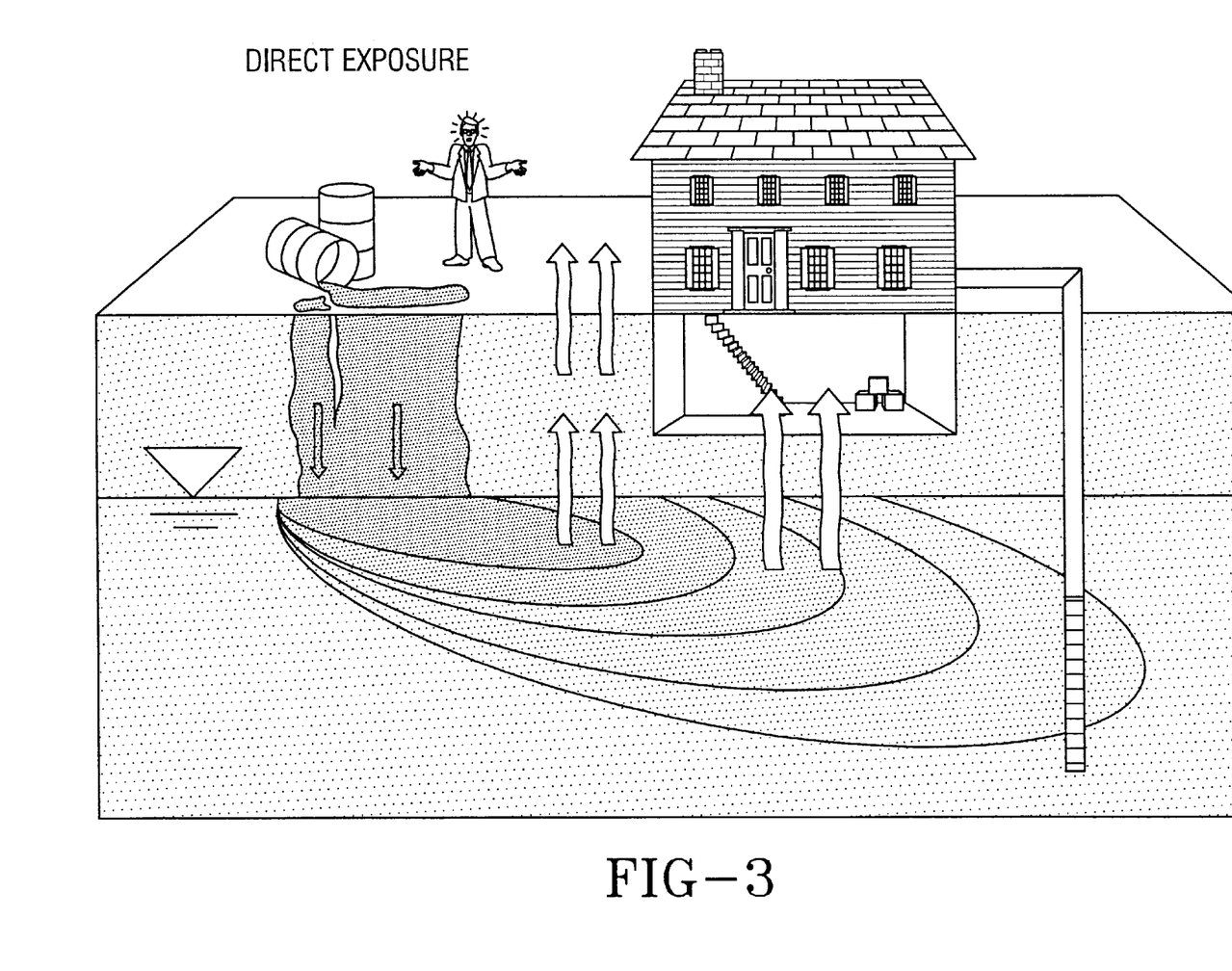
FIG. 3 is a diagram showing an example of direct exposure to a contaminant.
Figure 4:
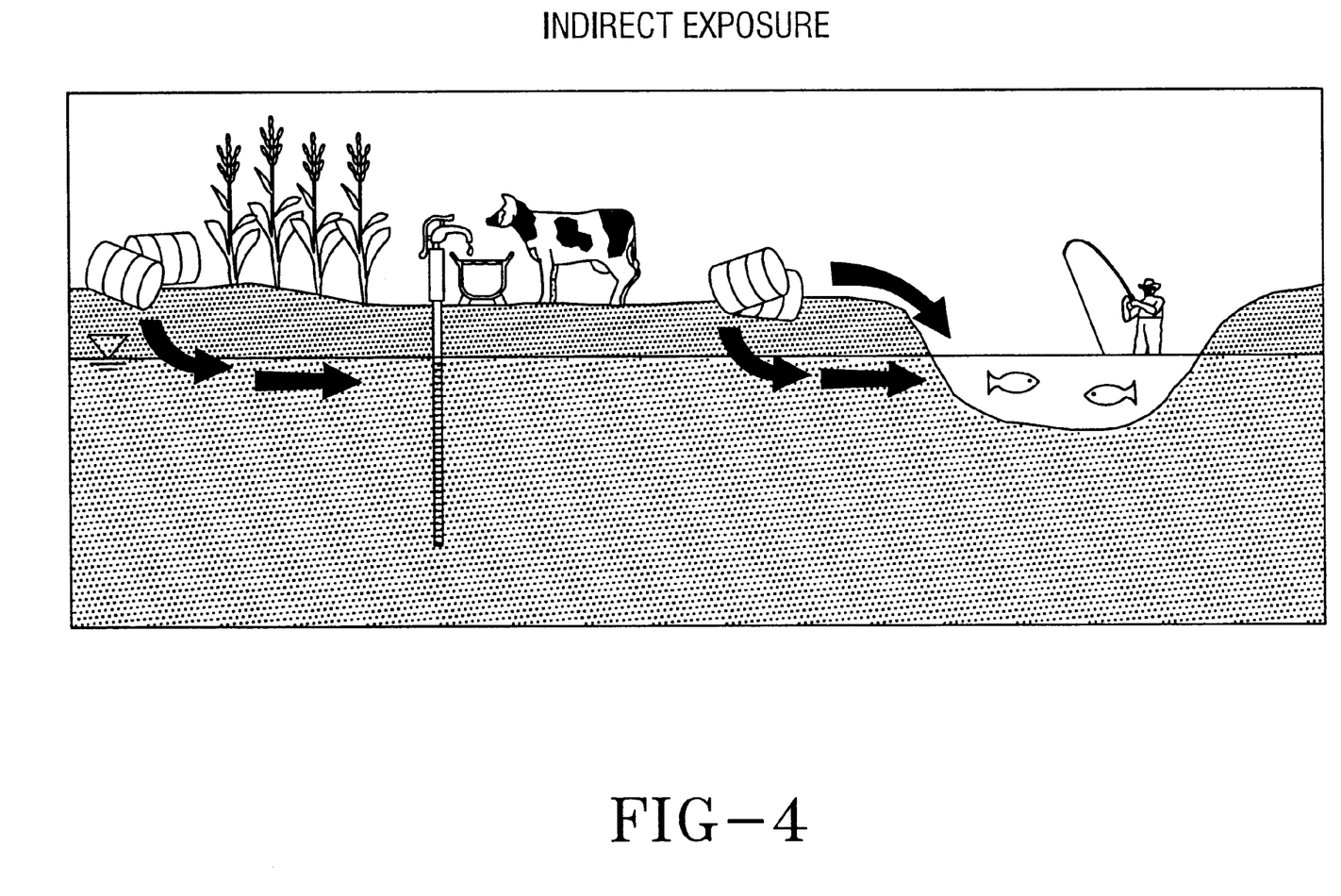
FIG. 4 is a diagram showing an example of indirect exposure to a contaminant.
Figure 5A:
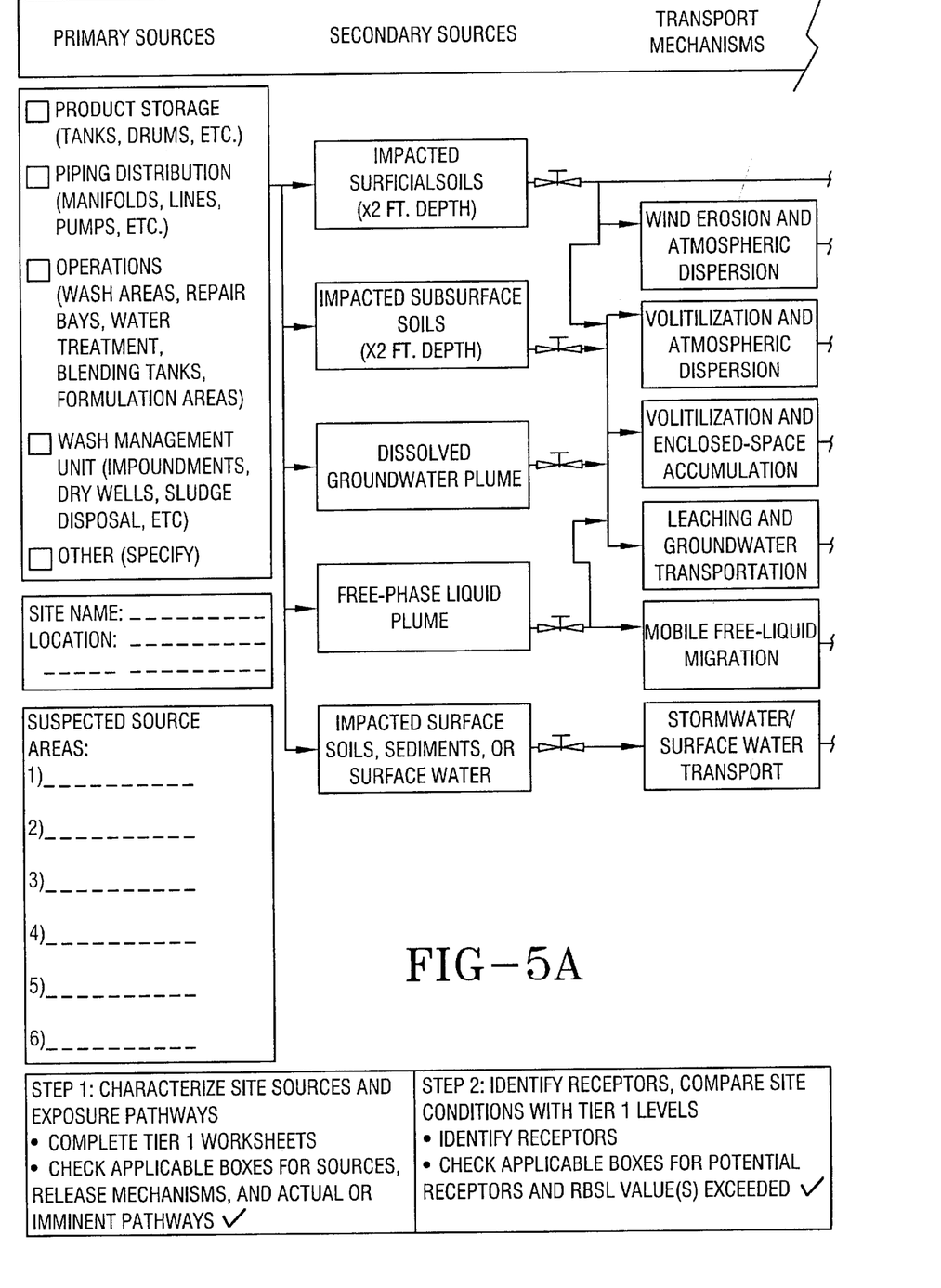
FIG. 5 is an exposure scenario evaluation flowchart.
Figure 5B:
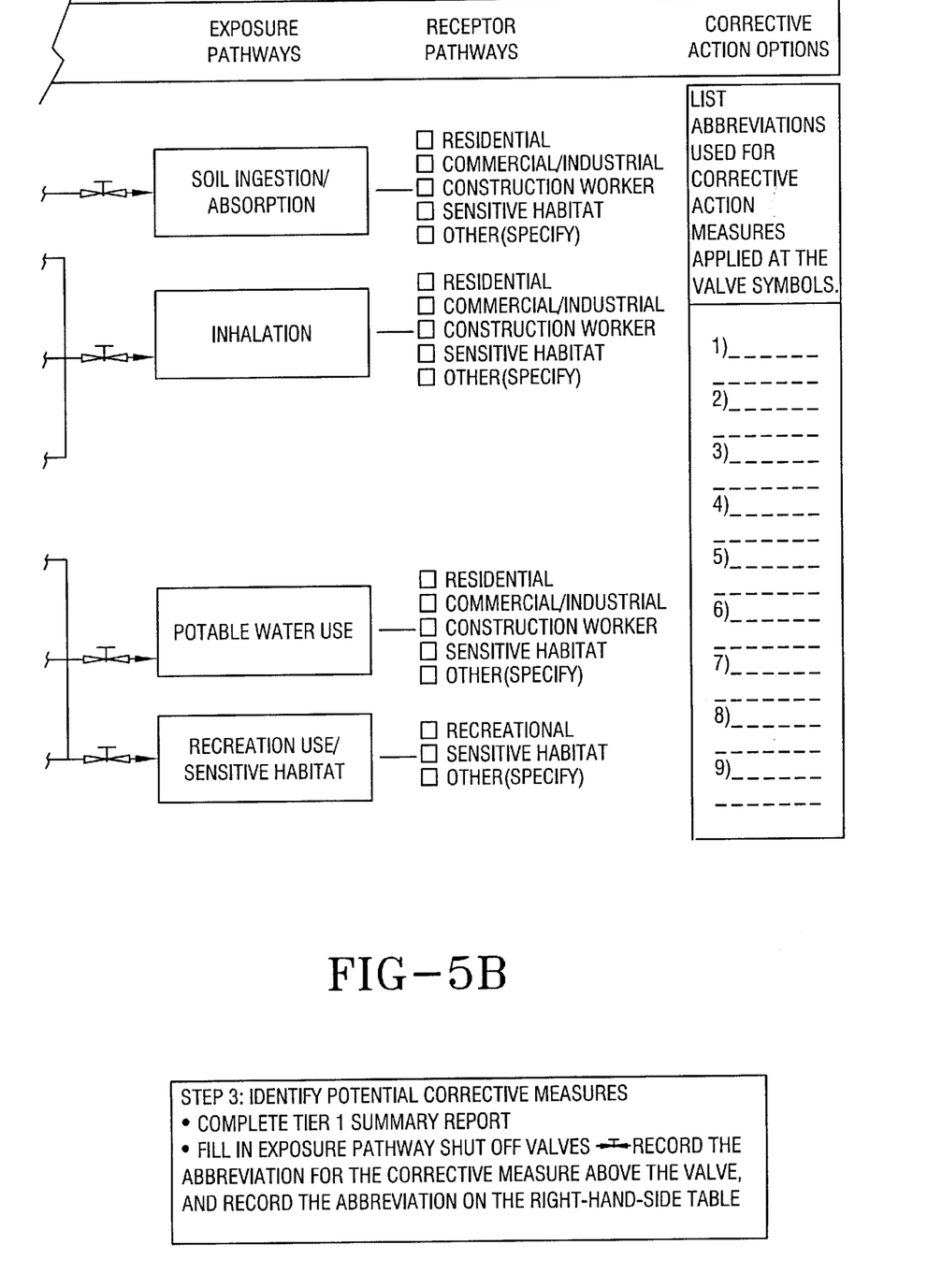
Figure 6A:
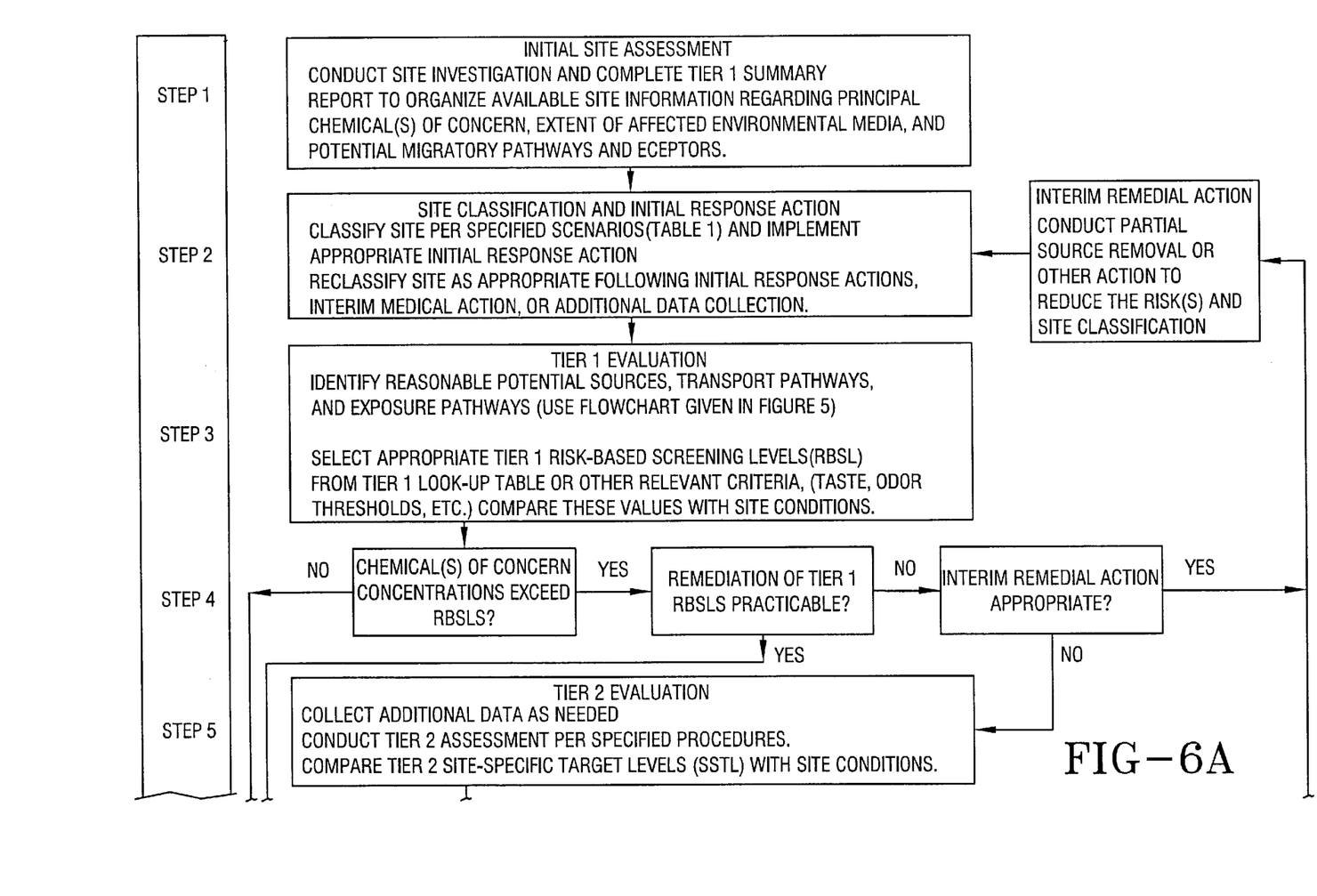
FIG. 6 is risk-based corrective action process flowchart.
Figure 6B:
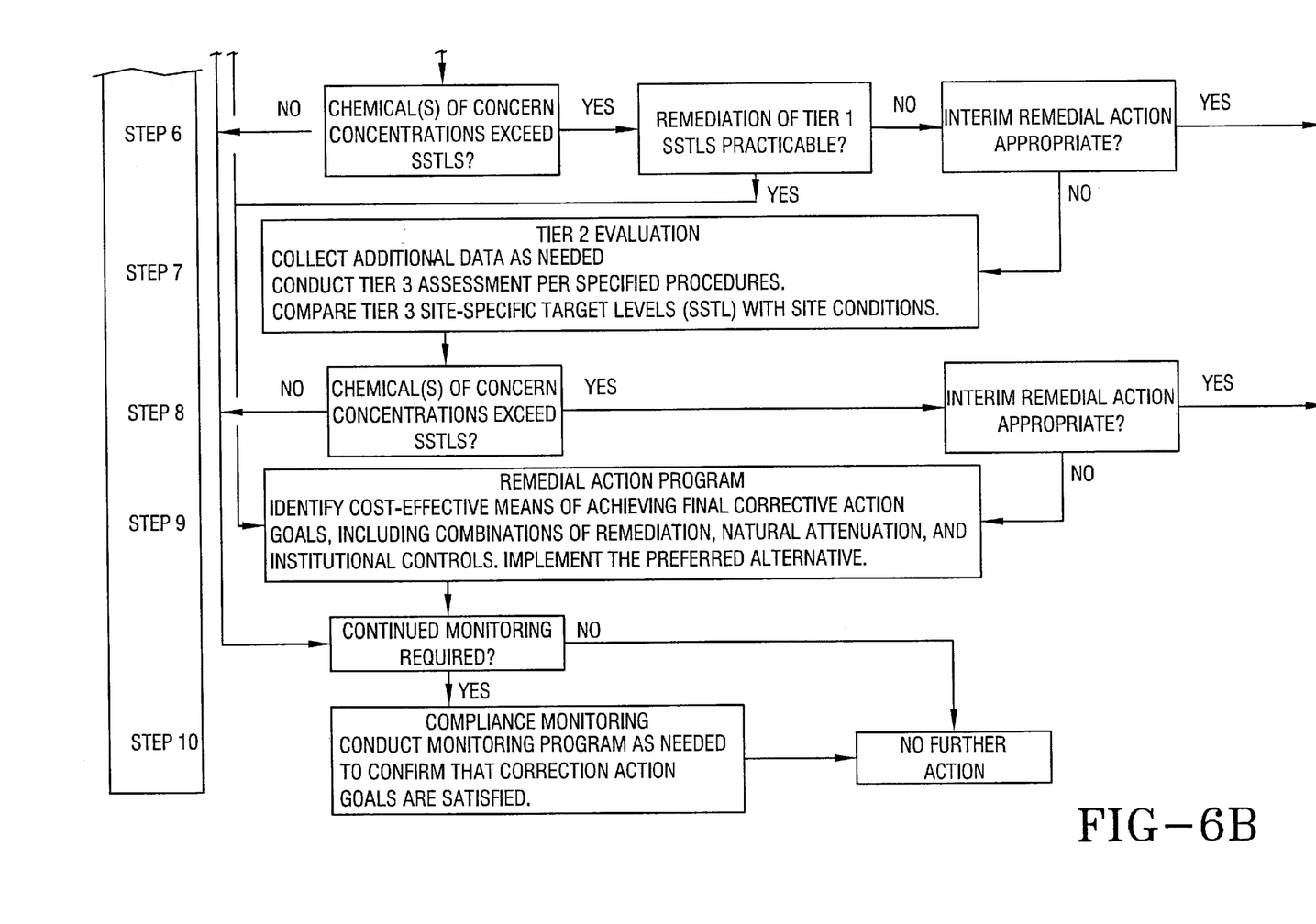

The following description is merely one embodiment of the invention, and is not intended to limit the invention in any manner. The software allows quick access to all geographic and project specific information. Geographic information, accessible through GIS components, may include such things as site maps, engineering drawings, topographic maps, sample points, etc. Project management information is managed through interactive message boards and scheduling calendars, which record communications relative to the project and show construction, inspection, compliance and reporting deadlines relative to the project. Other project data includes analytical results, prepared reports, expense and revenue spreadsheets, etc., and is stored using database tools and electronic filing cabinets.

The process starts with an account, which can have any number of physical sites. The physical sites may include, but are not limited to, property/real estate, construction sites, environmental compliance sites (i.e. sites that require environmental permits or licenses to comply with regulations), environmental investigation and remediation sites, natural resource management sites (i.e. oil wells, water wells, mines, forestry, etc.) This list is intended for illustrative purposes only, and is not intended to limit the invention in any manner.

The operation, management, and construction of the particular sites are well known in the art and, for the sake of brevity, will not be further described herein. Also, the collection of data, and the operation of GIS software is well known in the art and will not be further described herein. The data is collected and entered into the inventive system in any known manner, as long as chosen using sound engineering judgment.

The inventive risk assessment method in this embodiment includes the use of a global computer network to provide access to continuously updateable information in order to perform a risk assessment.

EXAMPLE 1

In the present embodiment the network component is the Internet (i.e. global computer network).

The first user interface of the present invention is a log-on screen that requires a user name as well as a password. Once the user enters the correct information they are taken to the Account Selection page, wherein the list of possible accounts for that user are listed. The user selects the desired account from the list and clicks the "Select" button. The user is then taken to the Site Index, which lists all the possible sites that are owned or operated by a particular account. A site is chosen from the list and the invention brings up the data for that particular site. Some of the possible tools available, once a site has been selected, include, but are not limited to, an atlas, topographical maps, engineering drawings, risk assessment calculator, administration, message boards, file cabinets, calendars, site data entry, etc.

This particular example will only describe the Risk Assessment portion of the software program. In a risk assessment the process begins with the collection and evaluation of samples from a site. It is to be understood that the risk 30 assessment is not limited to a specific site, but can be a collection of different sites, or simply generic information for a hypothetical site. The collection and analysis of the samples is well known in the art and, for the sake of brevity, will not be described further herein. Once the data collection and evaluation has been completed, that information is then entered into the inventive system. It is to be understood that the raw data collected from the site could be entered directly into the inventive system and evaluated and analyzed on the system.

The inventive system then performs both an exposure assessment and a toxicity assessment on the information. The exposure assessment determines what receptors are, or may be, exposed to the contaminants at the particular concentrations. The entities who may be affected can include plants and animals, as well as humans. The assessment can also determine how much of the contaminant the entities will, or may be, exposed to in the future. The calculations used to determine the exposure assessment are well known in the art and will not be described herein.

In the exposure assessment, the contaminant, population, route of exposure, and medium all need to be taken into consideration in order to determine the overall risk. The contaminant is simply the particular compound, or compounds, found at the site, the population is the entities potentially affected (i.e. adult males, age 30–50, female children, age 5–12, etc.), the route of exposure is the means by which the receptor is exposed to the contaminant (i.e. inhalation, ingestion, etc.), and the medium is the transporter (i.e. soil, water, air, etc.). The total site risk is equal to the sum of the risks for each contaminant, for each population, within each route of exposure, and for all media that occur within the same exposure scenario simultaneously. The calculations used in determining each of these is well known in the art, and will not be described herein.

Another aspect of the exposure assessment could be fate and transport modeling. Fate and transport modeling determines the fate of a contaminant as it is transported between (intermediary) or within (intramediary) an environmental medium. An example of intramediary fate and transport modeling would be the determination of concentration from one side of a lake to another as the contaminant travels through the water. An example of an intermediary fate and transport modeling would be the determination of concentration from the water of a lake to the sand of a beach. Again, the calculations used for fate and transport modeling are well known in the art, and will not be described herein.

For fate and transport modeling, the two approaches are the analytical approach and the numeric approach. The analytical approach is the simplification of complicated real world conditions so that exact solutions can be derived. Examples of this approach include BIOSCREEN® and BIOCHLOR. The numeric approach is an attempt to simulate real world conditions in all their complexities using advanced mathematical models that can derive very accurate results. Examples of this approach include MODFLOW and BIOPLUME.

Along with the exposure assessment, the toxicity assessment must be performed as well. Many times, the toxicity values have already been predetermined by government agencies such as the USEPA (United States Environmental Protection Agency). If a particular toxicity value is not predetermined than one can be determined when necessary. The determination of toxicity values is well known in the art, and the process will not be described herein. The toxicity assessment and exposure assessment work together to create the risk characterization.

The risk characterization is determined on both a carcinogenic and a non-carcinogenic basis. For each basis there is a separate algorithm, which will not be described herein. The risk characterization for carcinogenic substances is given in terms of a unitless probability (i.e. one excess cancer per hundred thousand people). The non-carcinogenic substances are calculated using a unitless hazard index. If the level of hazard exceeds one, than an adverse effect can happen. Since the inventive system is using a computer network, and in this example, a global computer network, the toxicity values can be updated continuously.

The final step in this process is the inclusion of the uncertainty levels that occur throughout the process. The calculations regarding the uncertainty levels are well known in the art and will not be described herein. It is to be understood, however, that quantitative uncertainty analysis is an optional step in the process.

The previous Example 1 is intended only to illustrate one embodiment of the invention and is not intended to limit the invention in any manner. The actual operation of the computer software is well within the knowledge of one ordinarily skilled in the art of software programming.

EXAMPLE 2

The process also works in reverse for target level development. If the target risk for a particular site is already known, then the determination needs to be focused on what concentrations of particular contaminants are needed to meet the target risk. For target level development, the toxicity assessment remains the same. For the exposure assessment, the target risk needs to be incorporated so that the risk assessor can calculate the potential dose of a contaminant that would create a risk at or below the target risk. Again, the calculations used to make these determinations are well known in the art and will not be described herein. The remainder of the process is identical to the risk assessment.

For each risk assessment, the assessor can either use a deterministic analysis or a probabilistic analysis. A deterministic analysis is a point estimate of the risk, where individual data points are used to determine the risk. However, for a probabilistic analysis a distribution is used to determine the risk. A distribution is a collection of data points from one particular sampling point. The methods and calculations used in deterministic and probabilistic analyses are well known in the art and will not be described herein.

The most widely used method for determining the standard or total risk for a site is the cumulative and additive method, where the total risk is each individual risk added together. Other possible methods include synergism, which ends up with a total risk that is greater than the sum or the parts, and antagonism, which ends up with a total risk that is less than the sum of the parts. Another method is to determine the risk for each contaminant or media separately and ignore any possible effects that they have on one another. Examples of risk assessment procedures are disclosed in ASTM Designation: E 1739-95 "Standard Guide for Risk-based Corrective Action Applied at Petroleum Release Sites" and in ASTM Designation PS 104-98 "Standard Provisional Guide for Risk-Based Corrective Action," both of which are incorporated herein by reference.

The basic risk assessment model is described in the following documents: USEPA 1989 Human Health Evaluation Manual Part A—EPA/540/1-89/0002 and USEPA 1996 Human Health Evaluation Manual Part B—EPA/540/R-92/003, both of which are incorporated herein by reference.

It is to be understood that the inclusion of the risk assessment with the project management software is merely one embodiment of this invention. The risk assessment software can be a stand-alone package.

The present invention is accessible via a computer network. This access to the computer network allows users all over the world to simultaneously and instantaneously access the relevant site information. For example, the entire project management/risk assessment can take place from a laptop computer in a hotel room.

On the inventive system, the user can access all of the relevant information regarding any site, including deadlines and upcoming tests, meetings, constructions, etc., monitor any questions or comments, view maps of the site and the surrounding area, print out and organize the information, all via a computer network.

Only the reference data/information needs to be stored on a centralized database. Other risk assessment information can be provided by the user of the system.

All of the relevant site information, in the above-listed Examples, is linked to a web-centric platform so that the user and/or his subcontractors can perform project management accessing the inventive system using a web browser.

Posting of information, as well as access to posted information, can be restricted to authorized personnel determined and controlled by the administrator. The site information will be structured in an individual site database to provide multiple security levels for certain types of data. The information can be transferred from the inventive system to the user's system, so that the user can view the information off-line. Again, the storage of electronic information is well known in the art and will not be further described.

The present invention has been described using both GIS software and a global computer network. However, these are merely particular embodiments of the invention and are not intended to limit the invention in any manner. As stated above, any network can be used as long as chosen using sound engineering judgment. Also, any tool that allows the user to view and/or manipulate the information in a textual or pictorial format may be used, as long as chosen using sound engineering judgment.

The invention has been described with reference to preferred embodiment. Obviously, modifications and alterations will occur to others upon a reading and understanding of this specification. It is intended to include all such modifications and alternations in so far as they come within the scope of the appended claims or the equivalence thereof.

Having thus described the invention, it is now claimed:

1. A method for network-enabled risk assessment, the method comprising the steps of:
   utilizing a global computer network;
   utilizing GIS software;
   providing environmental site data, population exposure, and chemical toxicity information, the information containing reference information, the reference information being continuously updateable;
   providing data storage means;
   providing data entry means for entering the information;
   providing means for entering exposure assessment data, which comprises the steps of:
      providing fate and transport modeling; and,
      providing means for entering at least one entity that may be exposed to at least one contaminant;
   providing means for entering toxicity assessment data;
   calculating risk characterization;
   providing target level development and risk assessment;
   providing means for factoring in uncertainty analysis data;
   providing controlled access to the information;
   updating the information;
   providing a deterministic numeric analysis of environmental numeric human health and ecological clean-up level calculation; and,
   providing a probabilistic numeric analysis of environmental numeric human health and ecological clean-up level calculation.

2. A risk assessment system, the system comprising:
   a global computer network;
   GIS software;
   environmental site data, population exposure, and chemical toxicity information, the information containing reference information, the reference information being continuously updateable;
   means for providing controlled access to the information;
   data storage means;
   data entry means for entering the information;
   means for entering exposure assessment data, the means including fate an transport modeling and means for entering at least one entity that may be exposed to at least one contaminant;
   means for entering toxicity assessment data;
   calculating means for calculating risk characterization;
   means for providing target level development and risk assessment;
   updating means for factoring in uncertainty analysis data;
   updating means for updating the information;
   means for providing a deterministic numeric analysis of environmental numeric human health and ecological clean-up level calculation; and,
   means for providing a probabilistic numeric analysis of environmental numeric human health and ecological clean-up level calculation.

* * * * *